United States Patent [19]
Bruns et al.

[11] Patent Number: 5,875,855
[45] Date of Patent: Mar. 2, 1999

[54] ROW CROP ROLLING SHIELD

[76] Inventors: Mark W. Bruns, 380 Connecticut St., Hutchinson, Minn. 55350; Steve A. Bruns, Rt. 1 Box 96, Hector, Minn. 55342

[21] Appl. No.: 863,863

[22] Filed: May 27, 1997

Related U.S. Application Data

[63] Continuation of Ser. No. 51,262, Mar. 7, 1996, Pat. No. Des. 379,464.

[51] Int. Cl.[6] .................................................. A01B 17/00
[52] U.S. Cl. .......................................... 172/510; 172/508
[58] Field of Search ...................... 172/508, 509, 172/510, 456, 517, 518, 624.5; 56/237, 328.1, 314, 192, 377

[56] References Cited

U.S. PATENT DOCUMENTS

| D. 260,264 | 8/1981 | Carlsson et al. . | |
|---|---|---|---|
| 2,762,287 | 9/1956 | Greiman | 172/510 |
| 4,070,974 | 1/1978 | Stacy, Jr. . | |
| 4,142,589 | 3/1979 | Schlagenhauf | 172/510 |
| 4,485,878 | 12/1984 | Aken | 172/510 |
| 4,538,688 | 9/1985 | Szucs et al. . | |
| 4,591,002 | 5/1986 | Meinert | 172/510 |
| 4,745,978 | 5/1988 | Williamson . | |
| 4,834,189 | 5/1989 | Peterson et al. . | |
| 4,987,841 | 1/1991 | Rawson et al. . | |
| 5,133,414 | 7/1992 | Youngkrantz | 172/510 |
| 5,222,562 | 6/1993 | Roiger | 172/510 X |
| 5,303,780 | 4/1994 | Evenson | 172/509 |

*Primary Examiner*—Thomas B. Will
*Assistant Examiner*—Robert Pezzuto
*Attorney, Agent, or Firm*—Burd, Bartz & Gutenkauf

[57] ABSTRACT

Row crop cultivator rolling shields mounted on an arm pivotally connected to a support extended rearwardly from a tool bar prevents soil moved by earth working tools from covering and damaging row crops. Each shield has a dish shaped body having a number of arcuate segments. Each segment has angularly disposed parts providing the body with a circumferential wave-like structure. A roller bearing secured to the central porion of the body mounts the shield on an axle mounted on the arm.

20 Claims, 4 Drawing Sheets

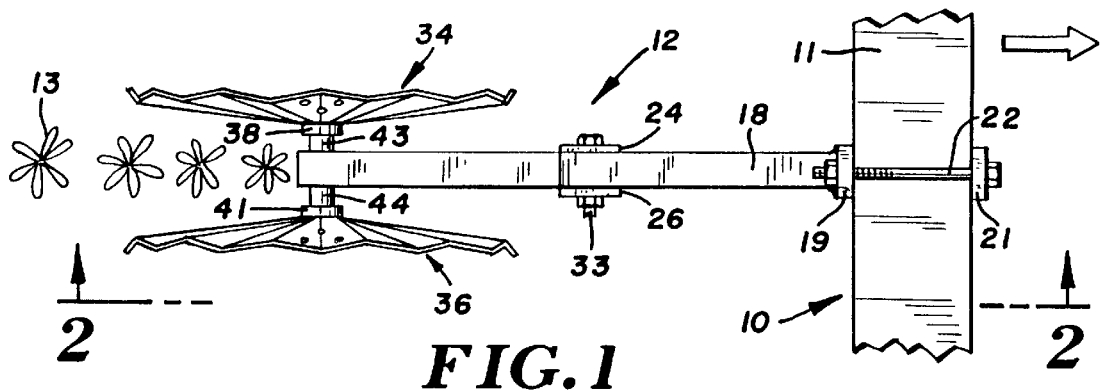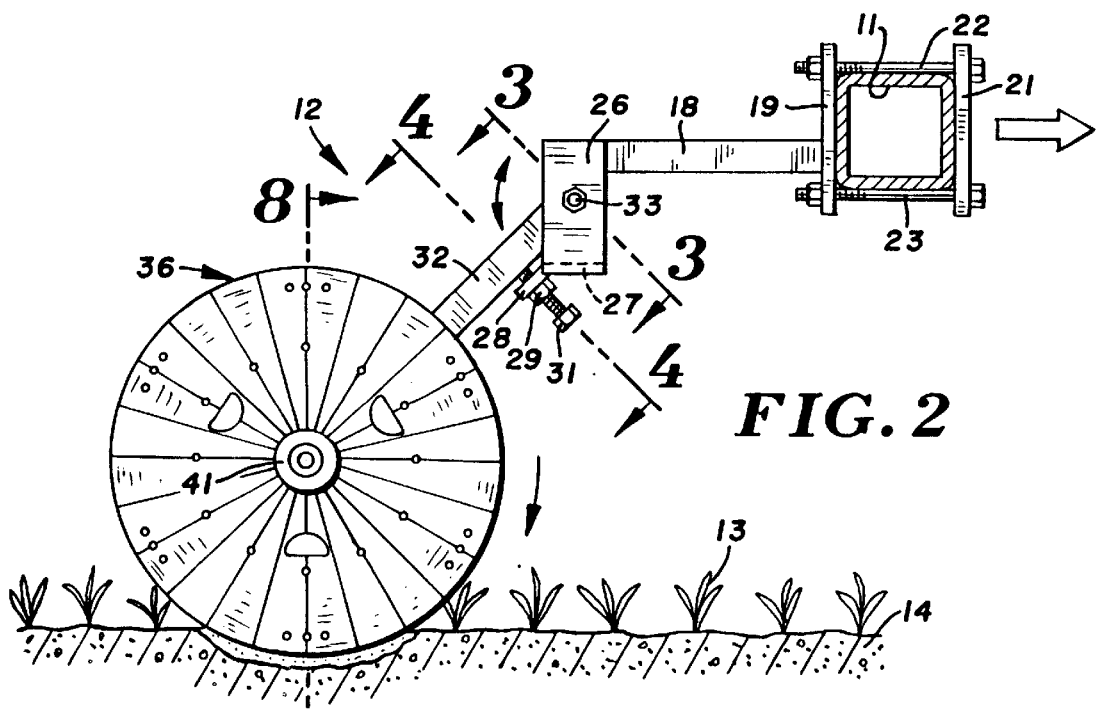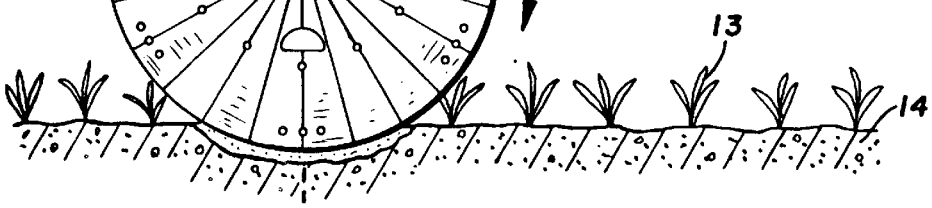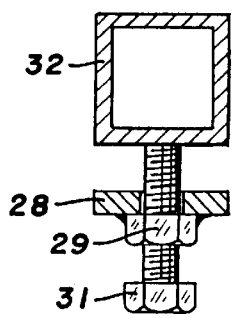

ROW CROP ROLLING SHIELD

CROSS REFERENCE TO RELATED APPLICATION

This application is a continuation of U.S. application Ser. No. 29/051,262 filed Mar. 7, 1996, now U.S. Pat. No. Des. 379,464.

FIELD OF THE INVENTION

The invention is in the field of earth working agricultural implements used to cultivate row crops. The implements have shields that function to prevent soil moved by cultivating tools from covering and damaging row crops.

BACKGROUND OF THE INVENTION

Row corp cultivators mounted on tractors have a plurality of earth working tools, such as shovels and rotary hoes, that work up the soil adjacent opposite sides of the crops. When the crops are small the earth working tools can turn and move the soil toward the crops so as to damage and cover the crops. The speed of the tractor accommodating the cultivator must be reduced to prevent crop damage. This increases the time and cost of cultivating a field of row crops. Shields and hoods have been attached to the cultivators to protect the crops from soil moved by the earth working tools.

SUMMARY OF THE INVENTION

The invention comprises cultivator rolling shields attachable to a tool bar of a row crop cultivator operable to protect row crops from moving soil and preventing damage to the leaves to the row crops. The shields are inwardly concave bodies having angularly related segments that in use engage the soil adjacent opposite sides of the row crops, aid in rotating the shields, and protect the crops from soil moved by the earth working tools of the cultivator. The bodies are one-piece wear resistant plastic dish shaped members having circumferential wave configurations. The bodies are secured to central bearings mounted on a transverse axle. The axle is secured to an arm pivotally mounted on a support attached to the tool bar of the cultivator. An adjustable stop mounted on the support engage the arm to limit downward movement of the bodies into the ground.

DESCRIPTION OF THE DRAWINGS

FIG. 1 is a top plan view of the row crop shields of the invention operatively connected to a tool bar of an earth working implement;

FIG. 2 is a sectional view taken along line 2—2 of FIG. 1;

FIG. 3 is an enlarged sectional view taken along the lines 3—3 of FIG. 2;

FIG. 4 is an enlarged section view taken along the line 4—4 of FIG. 2;

DESCRIPTION OF THE PREFERRED EMBODIMENT OF THE INVENTION

Figure 5:
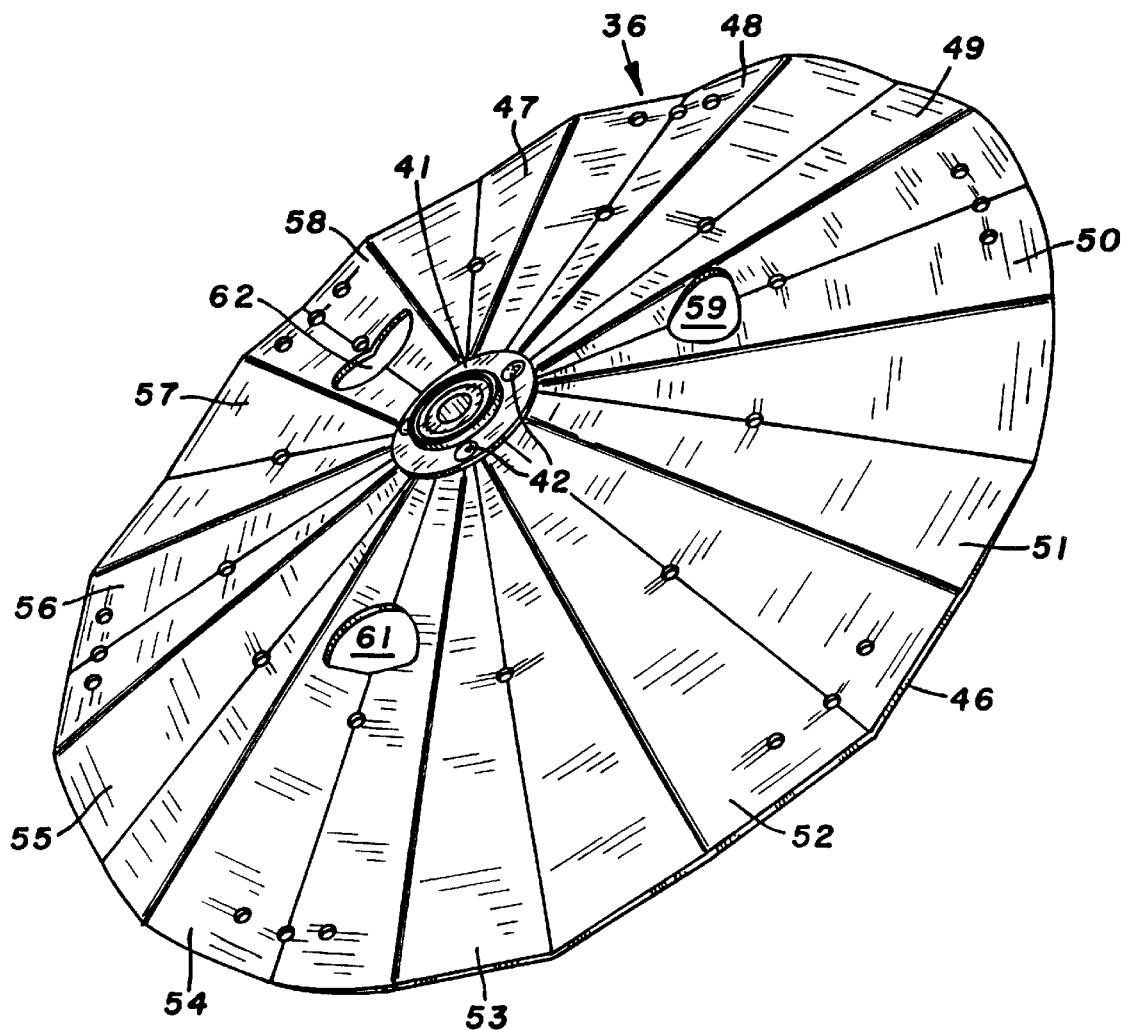
FIG. 5 is an enlarged perspective view of the row crop shield.
Figure 6:
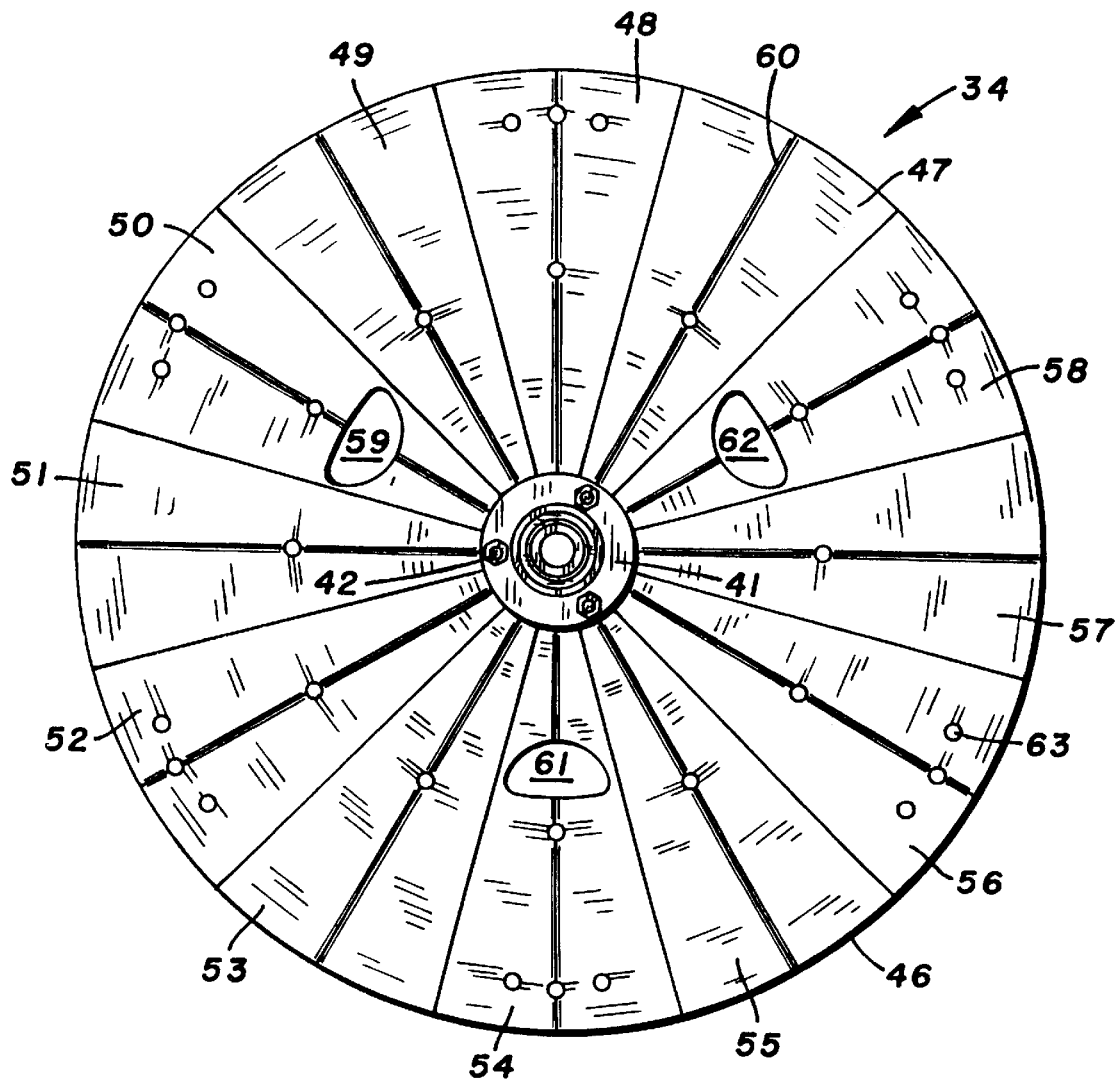
FIG. 6 is a side elevational view of the row crop shield.

Referring to FIGS. 1 and 2, there is shown a portion of a row crop cultivator 10 used to work soil 14 adjacent opposite sides of a row of crops 13, such as field corn, popcorn, beans, cotton, sunflowers and sugar beets. Cultivator 10 has earth working tools 16 and 17, shown in FIG. 7, that work and cultivate soil 14 along opposite sides of crops 13. The cultivator is equipped with additional tools (not shown) that work the soil between the rows of crops and adjacent additional rows of crops.

Interposed between tools 16 and 17 is a rolling shield assembly indicated generally at 12, that prevents soil from covering and damaging crops 13. Shield assembly 12 has a horizontal support 18 mounted on tool bar 11 with a pair of plates 19 and 21 and nut and bolt assemblies 22 and 23. Support 18 is secured with a weld to plate 19 to maintain the horizontal position of support 18 and prevents movement of support 18 relative to tool bar 11.

A pair of downwardly directed members 24 and 26 are secured to the rear or free end of support 18. A plate 27 having a downwardly inclined tab 28 is attached to members 24 and 26. As shown in FIG. 4, a nut 29 is secured to tab 28 accommodates a bolt 31 that serves as a stop for an arm 32. A pivot member or bolt 33 pivotally mounts arm 32 to members 24 and 26 for movement about a transverse axis generally parallel to transverse tool bar 11. Bolt 31 engages arm 32 to limit downward movement of arm 32 and shields 34 and 36. Bolt 31 threaded through nut 29 is also used to adjust the stop position of arm 32 and the depth of shields 34 and 36 into the ground as seen in FIG. 2.

Figure 7:
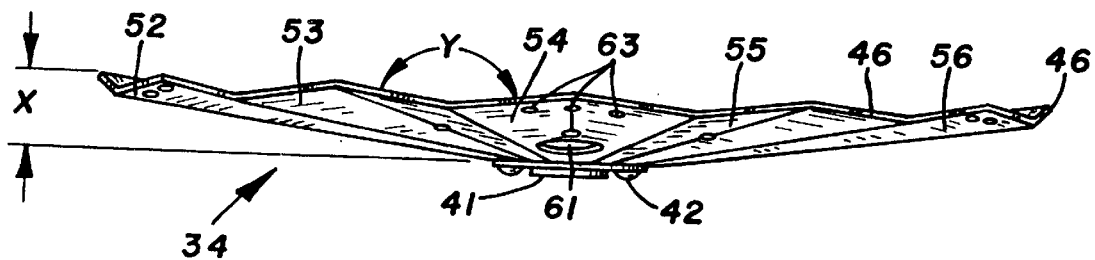
FIG. 7 is a bottom plan view of the row crop shield of FIG. 6.
Figure 8:
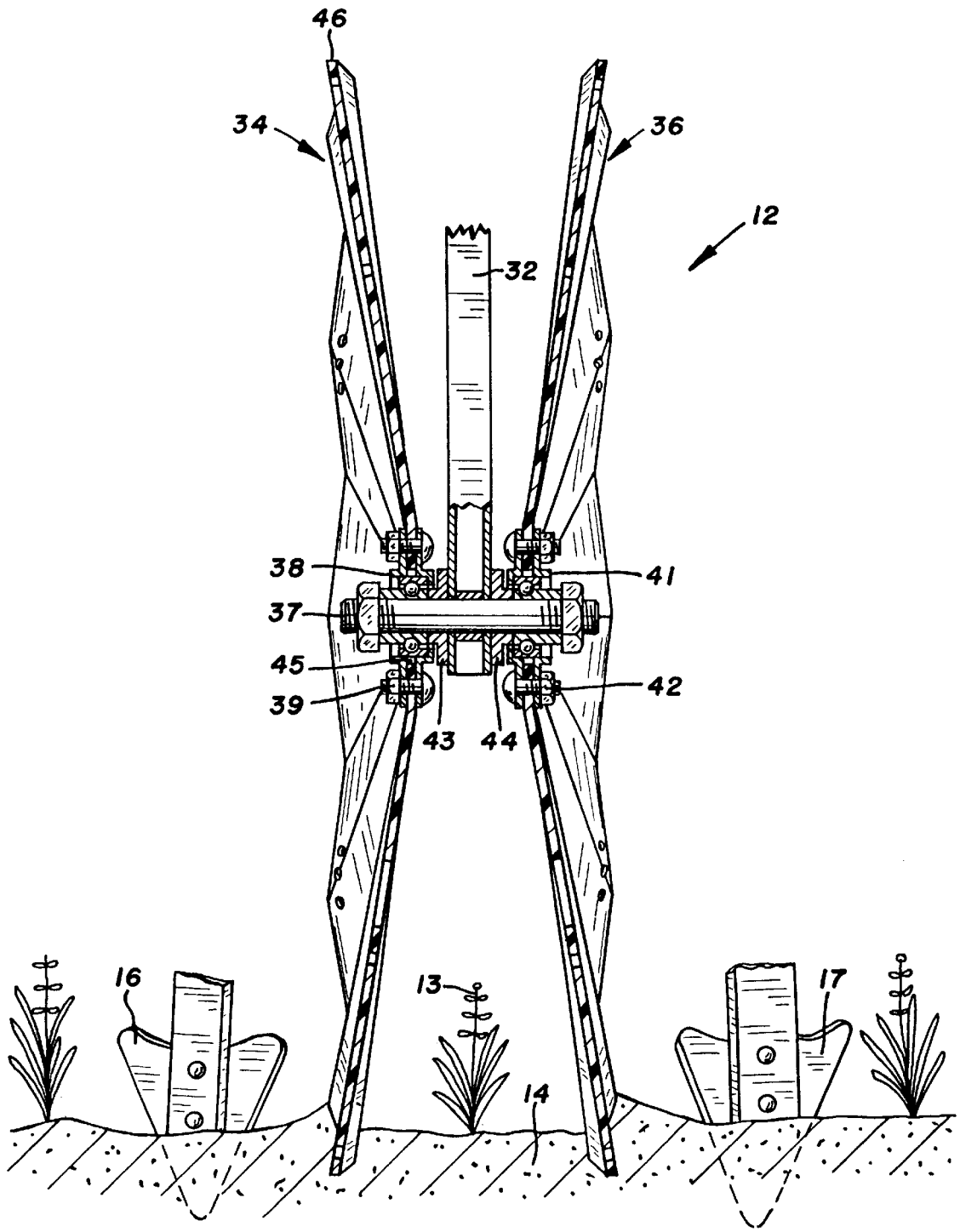
FIG. 8 is an enlarged sectional view taken along the line 8—8 of FIG. 2.

A transverse axle 37 is secured to the outer or lower end of arm 32. As shown in FIG. 7, a first bearing assembly 338 mounted on axle 37 is attached to shield 34 with nut and bolt assemblies 39. A second bearing assembly 41 mounted on axle 37 opposite bearing assembly 38 is attached to shield 36 with nut and bolt assemblies 42. Bearing assemblies 38 and 41 are shown as roller bearings. Other types of bearings and seals can be used to rotatably mounted shields 34 and 36 on axle 37.

Shields 34 and 36 are laterally spaced from each other an opposite sides of arm 32. Spacers 43 and 44 mounted on axle 37 on opposite sides of arm 32 locate shields 34 and 36 on axle 37 maintain the lateral space between shields 34 and 36.

Shields 34 and 36 have identical structure. Each shield is an inwardly , one-piece, plastic body having a zig-zag or wave circumferential configuration. The plastic body is considerably lighter than metal and does not collect soil and mud in use. The body has a circumferential wave configuration that reduces corp damage and facilitates rolling along the ground. The following description is directed to shield 36.

Disk shield 36 has an outer peripheral continuous edge 46 and a circular central opening 45. Bearing assembly 38 fits into opening 45 and is connected to shield 34 with nut and bolt assembles 42. Shield 36 has angular generally triangular segments 47–58 spaced circumferentially around the shield. Shield is divided into 12 generally equal and triangular segments 47–58. Each segment has two angularly disposed equal flat parts joined along a radial, ridge or apex. The parts extend from the center of the shield to the outer peripheral edge thereof. The obtuse angle between the parts can vary. Each segment 47–58 has a broad V-shaped and slants inwardly from outer peripheral edge 46 to the center opening 45. The shield has a dish-like shape. Segments 47, 51, and 55 have ovaloid shaped openings 59, 61, and 62 to allow air to flow through the disk shield. Additional small holes 63 are in alternate segments 48, 50, 52, 54, 56 and 58. Outwardly directed teeth or fingers (not shown) can be attached to these segments with nut and bolt assemblies to aid in turning of the shields and working the soil adjacent the row of crops 13.

An example of disk shield 34 is as follows. The shield 34 has a one-piece plastic body having a diameter of 24 inches and a continuous outer circular edge having a circumferential length of 72 inches. Bearing assembly 41 is a conventional 3.5 inch roller bearing attached to the body with three nut and bolt assemblies 42. The body has a uniform thickness of 3/16 inch. The plastic of body is an ultra-high molecular weight polyethylene that is wear resistant and has a low friction surfaces that do not collect soil or mud. The body has twelve V-shaped segments 47–58. Each segment 47–58 has a radial apex 60 dividing the segment into two equal triangular flat sections or parts. Each segment has an outer peripheral edge having a length of 6 inches. Each section of a segment has an outer peripheral edge of 3 inches. The sections of each segment are angularly orientated relative to each other. The obtuse angle Y between the section is 160 degrees. The body is concave or dish shaped with each section converging inwardly toward bearing assembly 41. Each segment slops inwardly at an angle of about 10 degrees from a plane accommodating the outer edge 46. The depth X of the body from the outer edge 46 to the center is 2 inches as shown in FIG. 7. The middle of body has three ovaloid or half circular openings 59, 61 and 62 equally spaced around the body to allow air to flow through the shield as the shield rolls on the ground. The body has additional holes for fasteners that attach fingers or teeth to the body that work the soil and aid in rotation of the shield on the ground.

In use as shown in FIGS. 1 and 2, shield assembly 12 and additional shield assemblies are mounted on tool bar 11 which each shield assembly aligned with a row of crops. Tool 11 is coupled to a tractor with a conventional 3-point hitch which is operable to selectively raise the lower the cultivator and shield assemblies. When tool 11 is lowered the earth working tools 16 and 17 and shields 34 and 36 are in the ground adjacent opposite sides of the row of crops. Tools 16 and 17 work up the soil and move soil laterally toward the row of crops. Shields 34 and 36 prevent the soil from covering and damaging the crops and minimize damage to crop leaves. The wave sections of the body of the shields increase the strength of the shields, facilitates rotation of the shields on the ground, and provides lateral space for crop leaves. The outer wave surfaces of the shields being plastic do not collect mud and dirt. The rolling shields 34 and 36 having dish shapes turn soil away from the row of crops as they rotate adjacent opposite sides of the row of crops 13.

While the invention has been described in conjunction with a specific embodiment of the shield assembly, it is evident that numerous alternatives, modifications and variations will be apparent to those skilled in the art in light of the foregoing disclosure. The invention is intended to embrace all such alternatives, modifications and variations that fall within the terms or equivalence there of the appended claims.

I claim:

1. A row crop cultivator shield comprising: a dish-shaped body having a continuous circular outer peripheral edge and a central hole, said edge having the same radius around the entire circumference of the edge, said body including a plurality of circumferentially arranged generally triangular segments, each segment having a radial ridge dividing the segment into two generally equal parts, said parts being angularly disposed relative to each other providing the body and the outer peripheral edge of the body with a circumferential wave configuration, bearing means extended through said central hole for mounting the body for rotation on an axle, and means securing the bearing means to the body.

2. The shield of claim 1 wherein: said body is a one-piece plastic member.

3. The shield of claim 1 including: an opening in a generally central portion of at least one of the segments to allow air to flow through the body.

4. The shield of claim I including: openings in generally central portions of circumferentially spaced segments to allow air to flow through the body.

5. The shield of claim 1 wherein: said body has twelve generally triangular segments, each segment having two generally flat equal parts angularly disposed relative to each other providing the body with said circumferential wave configuration.

6. The shield of claim 5 wherein: the outer peripheral edge has a circumference of about 72 inches, the body has a diameter of about 24 inches, and the angle between the parts of each segment is about 160 degrees.

7. A row crop cultivator shield comprising: a dish-shaped body having a continuous circular outer peripheral edge and a plurality of circumferentially arranged generally triangular segments, said edge having the same radius around the entire circumference of the edge, each segment having a generally radial ridge dividing the segment into two parts, said parts being angularly disposed relative to each other providing the body and the outer peripheral edge of the body with a circumferential wave configuration, bearing means for mounting the body for rotation on an axle, and means securing the bearing means to the body.

8. The shield of claim 7 wherein: said body is a one-piece plastic member.

9. The shield of claim 7 including: an opening in a generally central portion of at least one of the segments to allow air to flow through the body.

10. The shield of claim 7 including: openings in generally central portions of circumferentially spaced segments to allow air to flow through the body.

11. The shield of claim 7 wherein: said body has twelve generally triangular segments, each segment having two generally flat equal parts angularly disposed relative to each other providing the body with said circumferential wave configuration.

12. The shield of claim 11 wherein: the outer peripheral edge has a circumference of about 72 inches, the body has a diameter of about 24 inches, and the angle between the parts of each segment is about 160 degrees.

13. A row crop shield assembly for a cultivator having a tool bar comprising: a first shield, a second shield located laterally of the first shield, axle means supporting the first and second shields for rotation about an axis, means connecting the axle means to the tool bar, each shield having a dish-shaped body and bearing means secured to the body mounted on the axle means rotatably supporting the body on the axle means, said having a continuous circular outer peripheral edge and a plurality of circumferentially arranged generally triangular segments, said edge having the same radius around the entire circumference of the edge, each segment having a radial ridge dividing the segment into two generally equal parts, said parts being angularly disposed relative to each other providing the body and outer peripheral edge of the body with a circumferential wave configuration.

14. The shield assembly of claim 13 wherein: said body is a one-piece plastic member.

15. The shield assembly of claim 13 including: openings in generally central portions of circumferentially spaced segments to allow air to flow through the body.

16. The shield assembly of claim 13 wherein: said body has twelve generally triangular segments, each segment having two generally flat equal parts, said parts being angularly disposed relative to each other providing the body with said circumferential wave configuration.

17. The shield assembly of claim 16 wherein: the outer peripheral edge has a circumference of about 72 inches, the body has a diameter of about 24 inches, and the angle between the parts of each segment is about 160 degrees.

18. The shield assembly of claim 13 wherein: the means for connecting the axle means to the tool bars includes a support attachable to the tool bar, an arm pivotally connected to the support, said axle means being secured to the arm whereby the first and second shields can move up and down along the contour of the ground as the shields roll on the ground.

19. The shield assembly of claim 18 including: stop means on the support located below the area to limit downward pivotable movement of the arm and the depth of the shields into the ground.

20. The shield assembly of claim 19 including: means to adjust the stop means to adjust the down position of the arm and the depth of the shields into the ground.

* * * * *